(12) United States Patent
Raghavan et al.

(10) Patent No.: US 8,626,974 B2
(45) Date of Patent: Jan. 7, 2014

(54) METHODS AND SYSTEMS FOR REDUCED SIGNAL PATH COUNT FOR INTERCONNECT SIGNALS WITHIN A STORAGE SYSTEM EXPANDER

(75) Inventors: Ramprasad Raghavan, Pune (IN); Alpana Bastimane, Pune (IN)

(73) Assignee: LSI Corporation, Milpitas, CA (US)

( * ) Notice: Subject to any disclaimer, the term of this patent is extended or adjusted under 35 U.S.C. 154(b) by 150 days.

(21) Appl. No.: 13/354,018

(22) Filed: Jan. 19, 2012

(65) Prior Publication Data

US 2013/0191573 A1    Jul. 25, 2013

(51) Int. Cl.
*G06F 13/36* (2006.01)

(52) U.S. Cl.
USPC ......................................................... 710/306

(58) Field of Classification Search
USPC ......................................................... 710/306
See application file for complete search history.

(56) References Cited

U.S. PATENT DOCUMENTS

| | | | |
|---|---|---|---|
| 7,882,509 B2 | 2/2011 | Jones et al. | |
| 8,149,704 B2 * | 4/2012 | Hasegawa et al. | 370/232 |
| 8,219,794 B1 * | 7/2012 | Wang et al. | 713/2 |
| 2006/0015654 A1 * | 1/2006 | Krantz et al. | 710/5 |
| 2006/0047908 A1 * | 3/2006 | Chikusa et al. | 711/114 |
| 2007/0073947 A1 * | 3/2007 | Lau et al. | 710/110 |
| 2009/0119413 A1 * | 5/2009 | Seto | 709/245 |
| 2010/0281172 A1 * | 11/2010 | Parry et al. | 709/228 |
| 2011/0022736 A1 | 1/2011 | Uddenberg et al. | |
| 2011/0032889 A1 * | 2/2011 | Lee et al. | 370/329 |
| 2011/0099243 A1 * | 4/2011 | Keels et al. | 709/212 |
| 2011/0131375 A1 * | 6/2011 | Noeldner et al. | 711/114 |
| 2012/0054404 A1 * | 3/2012 | Day | 710/308 |
| 2012/0240017 A1 * | 9/2012 | Uchida | 714/821 |
| 2012/0311256 A1 * | 12/2012 | Nakajima et al. | 711/114 |

FOREIGN PATENT DOCUMENTS

| | | | | |
|---|---|---|---|---|
| EP | 2163997 A1 * | 3/2010 | | G06F 13/40 |
| JP | 2009181317 A * | 8/2009 | | G06F 3/06 |
| JP | 2010061665 A * | 3/2010 | | G06F 13/14 |
| JP | 2012108905 A * | 6/2012 | | G06F 13/14 |
| JP | 2012141943 A * | 7/2012 | | G06F 13/10 |
| JP | 2012226736 A * | 11/2012 | | G06F 3/00 |
| WO | WO 2007006267 A1 * | 1/2007 | | G06F 13/40 |

OTHER PUBLICATIONS

Cai, Y.; Fang, L.; Ratemo, R.; Liu, J.; Gross, K.; Kozma, M., "A test case for 3Gbps serial attached SCSI (SAS)," Test Conference, 2005. Proceedings. ITC 2005. IEEE International , pp. 9 pp. 660, Nov. 8-8, 2005.*

(Continued)

*Primary Examiner* — Faisal M Zaman
(74) *Attorney, Agent, or Firm* — Duft Bornsen & Fettig

(57) ABSTRACT

Methods and systems for reducing the signal path count between circuits within a SAS expander used for establishing SAS connections. The system comprises a SAS expander. The SAS expander comprises a plurality of link layer control circuits, each link layer control circuit adapted to communicatively couple with a SAS device. The SAS expander further comprises a connection manager communicatively coupled with the link layer control circuits for routing communications between the link layer control circuits. Each of the plurality of link layer control circuits is adapted to establish a SAS connection with another link layer control circuit through the connection manager by segmenting a plurality of interconnect signals into multiple data segments for sequential transmission to the connection manager, (e.g., without impacting the performance of the connection manager). The connection manager interprets the data segments to extract the plurality of interconnect signals to establish the SAS connection.

20 Claims, 5 Drawing Sheets

(56) References Cited

OTHER PUBLICATIONS

Mutnury, B.; Cases, M.; Nam Pham; De Araujo, D.N.; Matoglu, E.; Patel, P.; Hermann, B., "Analysis of fully buffered DIMM interface in high-speed server applications,"Electronic Components and Technology Conference, 2006. Proceedings. 56th , pp. 6.*

Nanju Na; Tao Wang; Baumgartner, S.; Mandrekar, R.; Yaping Zhou, "Link analysis and design of high speed storage buses in backplane and cabling environments," Electronic Components and Technology Conference (ECTC), 2010 Proceedings 60th , pp. 1929,1934, Jun. 1-4, 2010.*

Wang, W.Y.H.; Tow Chong Chong, "An Ethernet based data storage protocol for home network," Consumer Electronics, IEEE Transactions on , vol. 50, No. 2, pp. 543,551, May 2004.*

\* cited by examiner

METHODS AND SYSTEMS FOR REDUCED SIGNAL PATH COUNT FOR INTERCONNECT SIGNALS WITHIN A STORAGE SYSTEM EXPANDER

BACKGROUND

1. Field of the Invention

The invention relates generally to Serial Attached SCSI (SAS) expanders and more specifically relates to method and systems for reducing the signal path count between circuits within a SAS expander used for establishing/initializing SAS connections.

2. Discussion of Related Art

SAS supports a number of features for initiating connections between communicatively coupled SAS devices (i.e., between SAS initiator devices and SAS target devices). Typically, the SAS initiator and target devices will not be directly coupled with each other, but rather will be coupled through a switched SAS fabric comprising one or more SAS expanders. The SAS expanders route communications between the SAS devices they are coupled with. Furthermore, the SAS expanders may manage multiple different SAS connections at substantially the same time.

SAS expanders may (internally) comprise a connection manager circuit coupled with multiple link layer control circuits. The link layer control circuits may each be coupled for communication with a SAS device, and may be used by a coupled SAS device for requesting SAS expander operations to establish a connection with another device through another link layer control circuit of the expander. The connection manager circuit manages routing information at the SAS expander, and is capable of establishing SAS connections between various link layer control circuits. The connection manager circuit generally comprises a crossbar switch (or other switching circuitry) and associated logic to determine a route/path through the switch to couple one link layer control circuit to another for purposes of establishing a connection between two SAS devices through the expander.

It is common for SAS expanders to be designed with varying numbers of link layer control circuits in order to allow for a family of expander products. Such products may even include custom expander designs for integration with other systems. Thus, it is desirable that the link layer control circuits exist as separate circuits from the common connection manager circuit to provide for flexibility in the design of the expander. To facilitate communications between the link layer control circuits and the common connection manager circuit, SAS expanders typically include a parallel bus structure that allows for simultaneous transmission of a very large number (e.g., thousands) of interconnect signals at once between link layer control circuits and the connection manager. The link layer control circuits and the connection manager circuit exchange signals over these large parallel bus structures. In this manner, the circuits can operate rapidly to provide the switched connections desired for several initiators to communicate with several targets. This significant number of interconnect signals allows the link layer control circuits and the common connection manager circuit to, in essence, exchange all logic signals in real time (i.e., updated signals are provided at each clock pulse of a clock used by the circuits).

However, large parallel bus structures give rise to a number of issues that are undesirable. For example, large bus structures can result in significant increases in the complexity and size (e.g., die area) of integrated circuit packages for SAS expanders.

Thus it is an ongoing challenge to maintain desired performance for a SAS expander servicing a number of SAS devices to establish connections while reducing the complexity and size of the circuits implementing the link layer control and the connection manager functions.

SUMMARY

The present invention solves the above and other problems, thereby advancing the state of the useful arts, by providing methods and systems for reducing the signal path count for interconnect signals between link layer control circuits and a common connection manager circuit used to establish a SAS connection through a SAS expander. Specifically, the present invention takes advantage of known processing delays that occur while a connection manager is processing interconnect signals in various stages to establish a desired SAS connection. In other words, not all of the interconnect signals are required to be updated at all times between the link layer control circuits and the connection manager. Certain identified subsets of signals are used at each of various stages of the processing to establish a connection, and there is some processing delay within the circuits between these various stages of operation. Features and aspects hereof segment the signals into portions/segments and transfer the portions/segments sequentially over a smaller parallel bus structure. This transfer may occur as processing for each of the various stages occurs. For example, segments for the signals used at a first stage may be transferred in sequence. Other segments for the signals used at other stages may be transferred as required in advance of the processing of each stage. These features permit significant reduction in the size of the parallel bus structures coupling the link layer control circuits with the common connection manager circuit while maintaining the desired performance in establishing connections between link layers of the expander (and hence between initiator and target devices).

In one aspect hereof, a method is provided for utilizing a reduced pathway count parallel bus structure of a SAS expander by sequentially transmitting groups of interconnect signals used for establishing a SAS connection. The method comprises detecting, at a first link layer control circuit of a SAS expander, a request to establish a SAS connection with a second link layer control circuit of the SAS expander through a connection manager that communicatively couples the link layer control circuits and is adapted to route communications between the link layer control circuits. The method further comprises segmenting a plurality of interconnect signals at the first link layer control circuit into multiple data segments for transmission to the connection manager, and transmitting, in sequence, the multiple data segments to the connection manager. The method additionally comprises interpreting the data segments at the connection manager to extract the plurality of interconnect signals to establish the SAS connection.

Another aspect hereof provides a SAS expander which utilizes a reduced pathway count for a parallel bus structure by sequentially transmitting groups of interconnect signals used for establishing a SAS connection. The SAS expander comprises a plurality of link layer control circuits, each link layer control circuit adapted to communicatively couple with a SAS device. The SAS expander further comprises a connection manager communicatively coupled with the link layer control circuits for routing communications between the link layer control circuits. Each of the plurality of link layer control circuits is adapted to establish a SAS connection with another link layer control circuit through the connection manager by segmenting a plurality of interconnect signals into multiple data segments for sequential transmission to the connection manager. The connection manager is adapted to interpret the data segments to extract the plurality of interconnect signals to establish the SAS connection.

A further aspect hereof comprises a non-transitory computer readable medium embodying programmed instructions which, when executed by a processing element of a SAS expander, are operable for performing a method for utilizing a reduced pathway count parallel bus structure of a SAS expander by sequentially transmitting groups of interconnect signals used for establishing a SAS connection. The method comprises detecting, at a first link layer control circuit of a SAS expander, a request to establish a SAS connection with a second link layer control circuit of the SAS expander through a connection manager that communicatively couples the link layer control circuits and is adapted to route communications between the link layer control circuits. The method further comprises segmenting a plurality of interconnect signals at the first link layer control circuit into multiple data segments for transmission to the connection manager, and transmitting, in sequence, the multiple data segments to the connection manager. The method additionally comprises interpreting the data segments at the connection manager to extract the plurality of interconnect signals to establish the SAS connection.

DETAILED DESCRIPTION OF THE DRAWINGS

Figure 1:
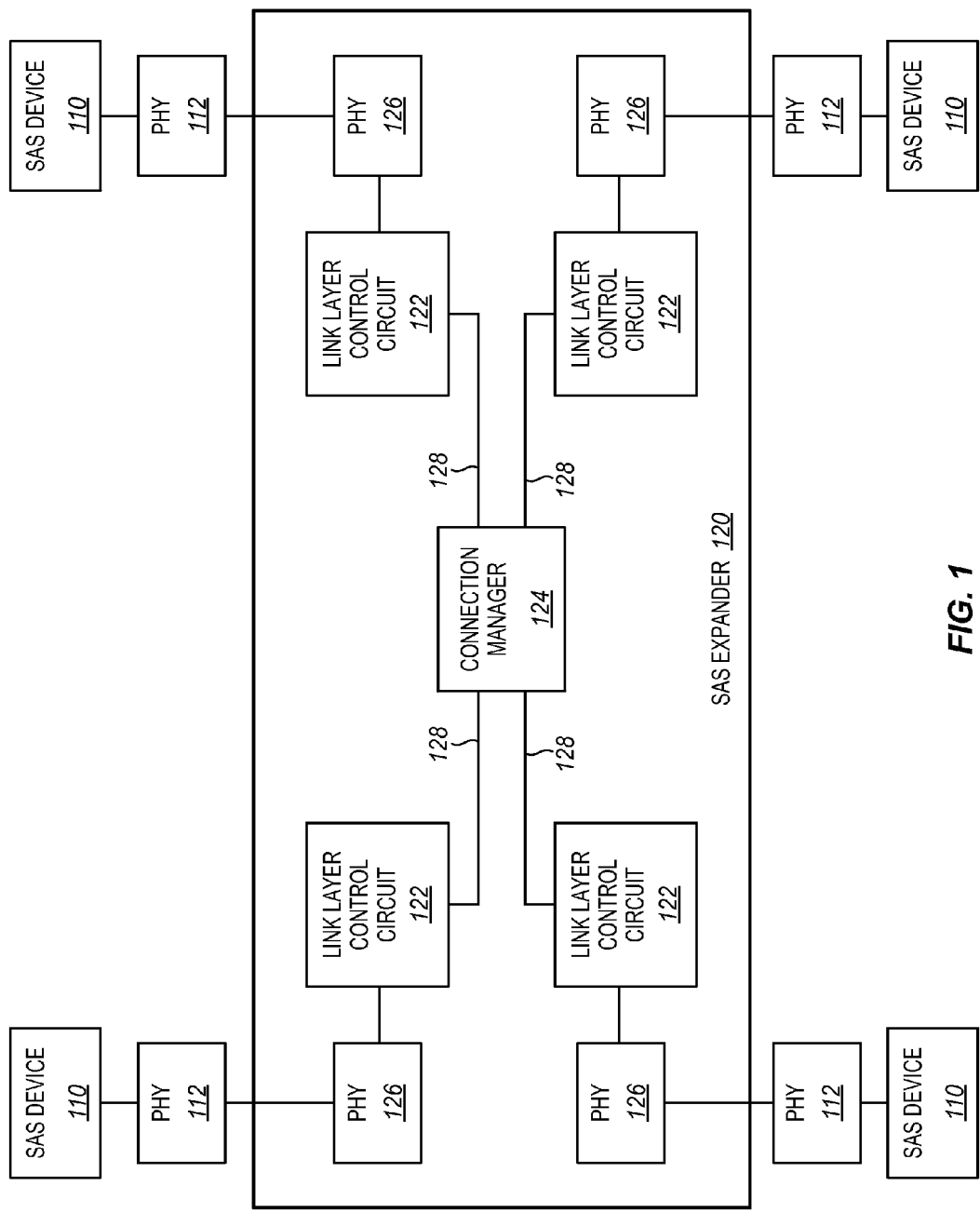
FIG. 1 is a block diagram of an exemplary SAS expander utilizing a reduced pathway count for a parallel bus structure coupling link layer control circuits to a connection manager in accordance with features and aspects hereof.

FIG. 1 is a block diagram of an exemplary SAS expander 120 utilizing a reduced pathway count for a parallel bus structure coupling link layer control circuits 122 to a connection manager 124 in accordance with features and aspects hereof.

Expander 120 provides for reduced signal path count for interconnections among a plurality of link layer control circuits 122 and a common connection manager 124 in accordance with features and aspects hereof.

According to FIG. 1, each SAS device 110 is coupled for communications with other SAS devices 110 via SAS expander 120. Specifically, each SAS device 110 is adapted to be coupled (through a corresponding PHY 112, which may be an internal feature of the SAS device 110) with a corresponding PHY 126 of a link layer control circuit 122 of SAS expander 120 (PHY 126 may similarly be an internal feature of a link layer control circuit 122. Each of link layer control circuits 122 is operable to communicate with connection manager 124 to establish a connection with another link layer control circuit 122 (through the switching features of connection manager circuit 124) to thereby establish SAS connections between various SAS devices 110 based upon communications with link layer control circuits 122.

SAS devices 110 may comprise any type of SAS devices including target devices such as storage devices and storage controllers, initiator devices such as storage controllers (e.g., Host Bus Adapters (HBA's)), and other SAS expanders (forming a hierarchy of expanders that provide a switched fabric for interconnection of initiator and target devices).

Link layer control circuits 122 comprise circuits of SAS expander 120 adapted for communicating with connection manager 124 for purposes of establishing a connection with another link layer control circuit 122 of expander 120. Link layer control circuits 122 may utilize customized internal logic to perform SAS link layer control functions and to communicate with connection manager 124 for purposes of establishing a connection with another link layer control circuit 122.

Connection manager 124 comprises any system, component, or device operable to manage the operations of SAS expander 120 to facilitate communications between SAS devices 110. In general, connection manager circuit 124 includes a crossbar switch that is programmed to connect link layer control circuits 122 with other link layer control circuits 122. Connection manager circuit 124 further includes routing logic to determine which other link layer control circuit 122 is appropriate to establish the desired route for connecting a SAS device 110 with another SAS device 110. Connection manager 124 is typically implemented as an integrated circuit, and is coupled with link layer control circuits 122 via communication channels 128.

Communication channels 128 comprise any suitable media for allowing electronic communicative coupling of connection manager 124 with link layer control circuits 122. For example, communication channels 128 may comprise electrically connected traces of printed circuit board, wires, conductive paths within integrated circuit dies, etc. Communication channels 128 are implemented as an internal bus structure of SAS expander 120. However, by comparison to prior solutions, the bus width is substantially smaller. Thus, the circuit interconnections may be simpler and circuit die area for SAS expander 120 may be correspondingly smaller.

While in operation, link layer control circuits 122 are operable (responsive to a request from an attached SAS device 110) to establish a SAS connection with connection manager 124 and thereby create a connection with another link layer control circuit 122 of expander 120. This, in turn, allows a SAS device 110 coupled with a link layer circuit 122 to communicate with another SAS device 110.

Specifically, each link layer control circuit 122 is operable to partition interconnect signals (used to establish the connection) into data segments that can be sequentially transmitted to connection manager 124 via a communication channel 128. Furthermore, the sequencing of the data segments takes advantage of known processing delays at connection manager 124. Thus, the data segments, even though they are received sequentially, do not impose further delay at connection manager 124 than would normally be experienced if connection manager 124 received all of the interconnect signals simultaneously. Because the data segments are provided sequentially, communication channels 128 may be made smaller (e.g., by a factor of ten) than they would have be to support the transmission of all interconnect signals in parallel at once. This is beneficial because it reduces the physical complexity and size of SAS expander 120.

Figure 2:
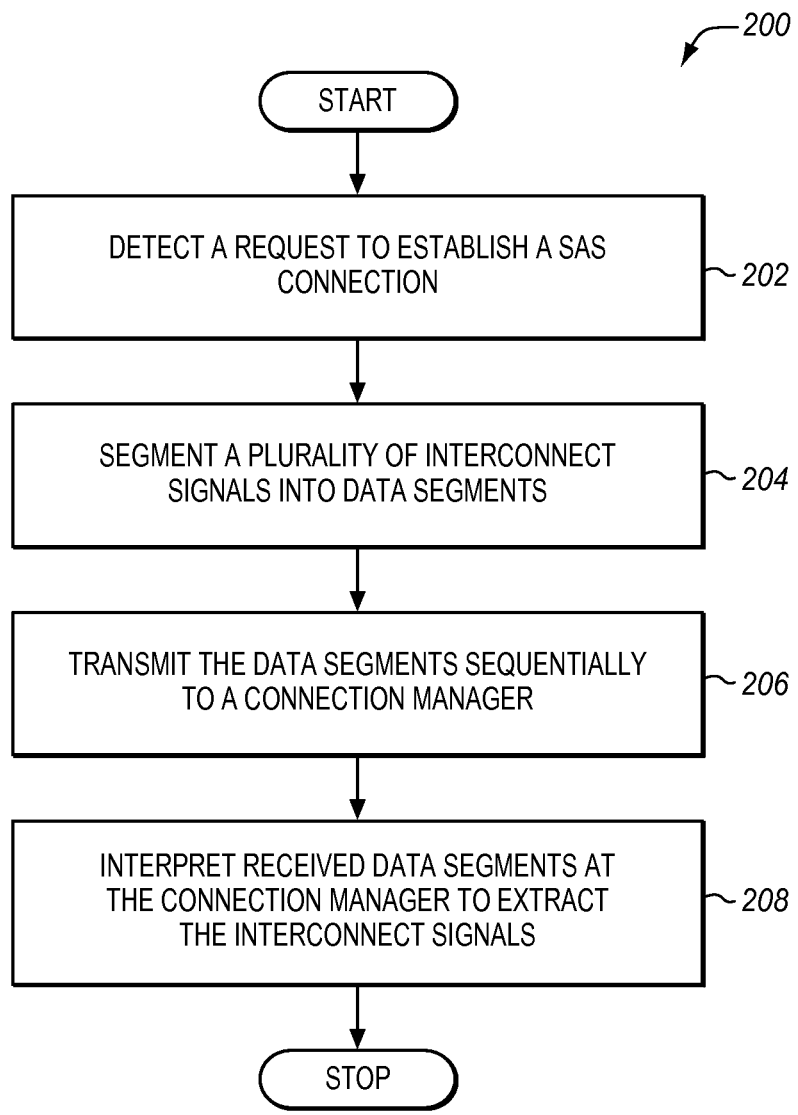
FIG. 2 is a flowchart describing an exemplary method in accordance with features and aspects hereof to reduce pathway count for a parallel bus structure of a SAS expander by segmenting interconnect signals used for establishing a SAS connection and transmitting the segments in sequence.

FIG. 2 is a flowchart describing an exemplary method 200 in accordance with features and aspects hereof to reduce pathway count for a parallel bus structure of a SAS expander by segmenting interconnect signals used for establishing a SAS connection and transmitting the segments in sequence. The method of FIG. 2 may be operable in a SAS expander such as described above with regard to FIG. 1.

Step 202 includes detecting, at a link layer control circuit, a request from a SAS device to establish a SAS connection. For example, an initiator SAS device may request a SAS connection with a target SAS device which is available via a SAS expander implementing the link layer control circuit. The request may be detected in the normal course of SAS operations and may be communicated from a PHY of the initiator SAS device to a receiving PHY located at the link layer control circuit coupled with the initiator device.

Step 204 includes segmenting a plurality of interconnect signals into data segments. The interconnect signals comprise data used by the connection manager to establish a SAS connection at the SAS expander. This connection in turn allows for the establishment of SAS communications between the initiator SAS device and the target SAS device. In one embodiment, each data segment comprises a set of signals that are transmitted in parallel across a bus of the SAS expander in a single clock pulse. Because the connection manager processes groups of signals received from link layer control circuits in a known sequence, it may be desirable to group data segments into stages. These stages may correspond to the order of processing that takes place at the connection manager. For example, one stage may be a sequence of data segments transmitted over the bus on consecutive clock pulses and used for identifying the requesting SAS device (e.g., an identification stage). Another stage may focus upon looking up a target SAS device. A third stage may involve arbitration wherein it is determined whether the device that initiated the request has permission to use the SAS connection.

Step 206 includes transmitting, in sequence, the data segments to the connection manager. The data segments are transmitted via a bus structure that is narrower than a bus size required to transmit all of the interconnect signals of the data segments simultaneously. If the data segments are grouped into stages (e.g., identification, lookup, and arbitration), then data segments of the same stage may be transmitted on consecutive clock cycles. During this transmission process, the data segments may be sent so that while the connection manager is processing a current stage, it receives data segments for the next stage from a link layer control circuit. By the time that the connection manager is ready to process the next stage, it will have received the appropriate data segments for that stage and may extract the relevant interconnect signals. In this manner, no extra delay is caused in the connection manager than would normally be experienced in prior systems. Thus, a smaller bus structure may be used than in prior systems. Note that while transmission is occurring, data segments may be accompanied by signaling information indicating the current stage. For example, a dedicated signal between a link layer control circuit and the connection manager may be used to indicate the current stage associated with data segments that are being transmitted.

Step 208 includes interpreting the data segments at the connection manager in order to extract the interconnect signals. The connection manager may perform this operation by analyzing each received data segment to find interconnect signaling information. If the data segments are grouped by stage, the connection manager may further associate the received interconnect signaling with the given stage. With the interconnect signaling information extracted, the connection manager may establish/initialize the SAS connection for the link layer control circuit.

Figure 3:
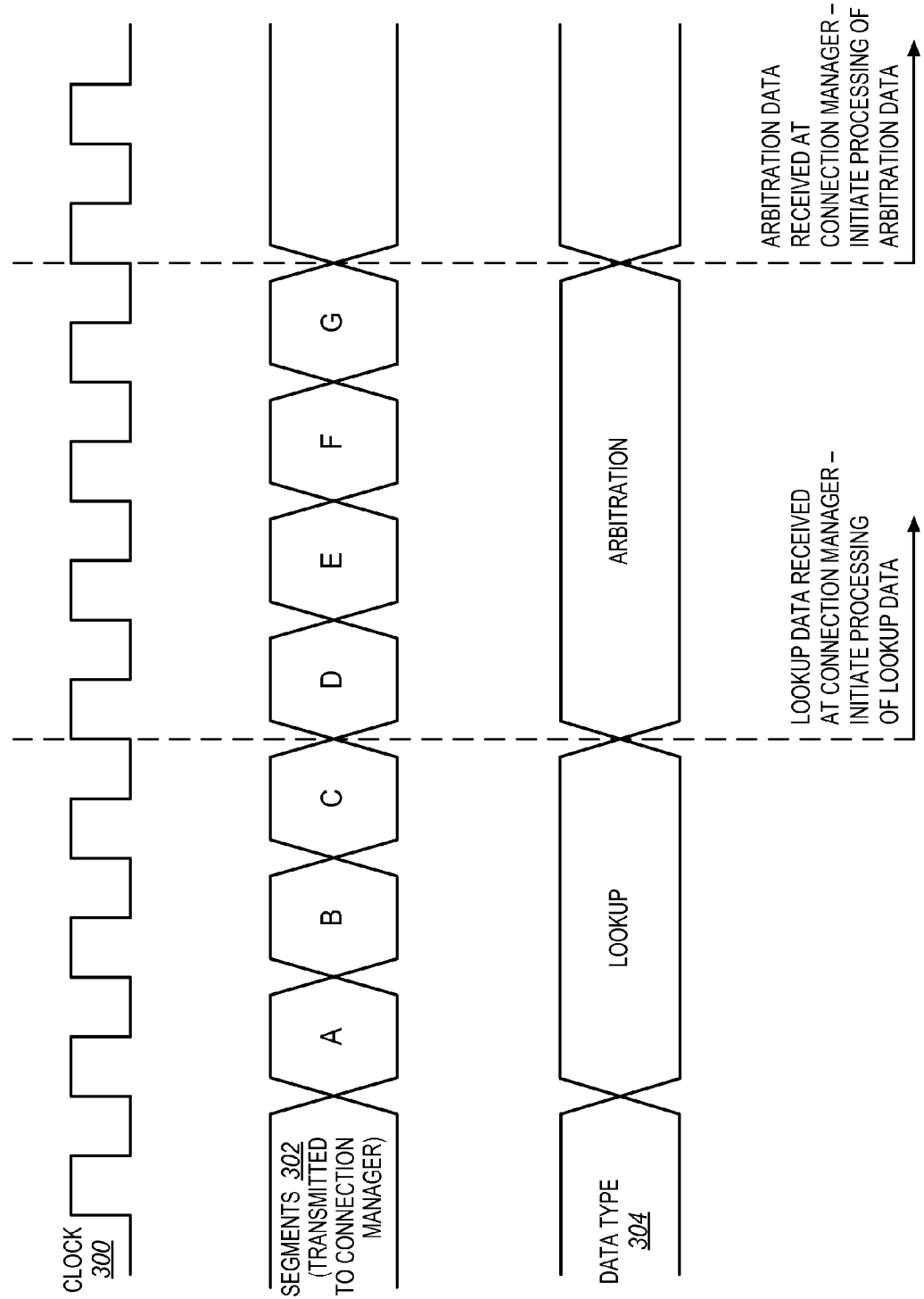
FIG. 3 is a diagram illustrating an exemplary transmission of segmented interconnect signals, in sequence, from a link layer control circuit to a connection manager in accordance with features and aspects hereof.

FIG. 3 is a diagram illustrating an exemplary transmission of segmented interconnect signals, in sequence, from a link layer control circuit to the connection manager in accordance with features and aspects hereof. According to FIG. 3, a uniform clock 300 synchronizes the actions of a link layer control circuit and the connection manager. During the sequential transmission of data segments 302, data segments 302 that are part of the same stage are transmitted on consecutive clock pulses. Each data segment is accompanied by data type information 304 indicating the stage with which the data segment is associated. Assume, for this example, that data segments for an identification phase have already been transmitted to the connection manager. Thus, in this example, data segments A, B, and C, being part of the lookup stage (e.g., a stage wherein routing information for the target SAS device is determined), are transmitted on consecutive clock pulses. Once each of the data segments 302 of the lookup stage has been received, the connection manager initiates processing of the lookup stage to determine routing information for the target SAS device (e.g., to find an appropriate outgoing SAS channel to another link layer control circuit). While the connection manager is processing the lookup stage data, the link layer control circuit further transmits data segments D, E, F, and G, relating to an arbitration stage (wherein the priority of the initiating SAS device is determined and compared to other SAS devices attempting to use the same outgoing channel). By the time the connection manager has finished processing the lookup stage and is ready to initiate processing the arbitration stage, data segments D, E, F, and G for the arbitration stage have been received.

Figure 4:
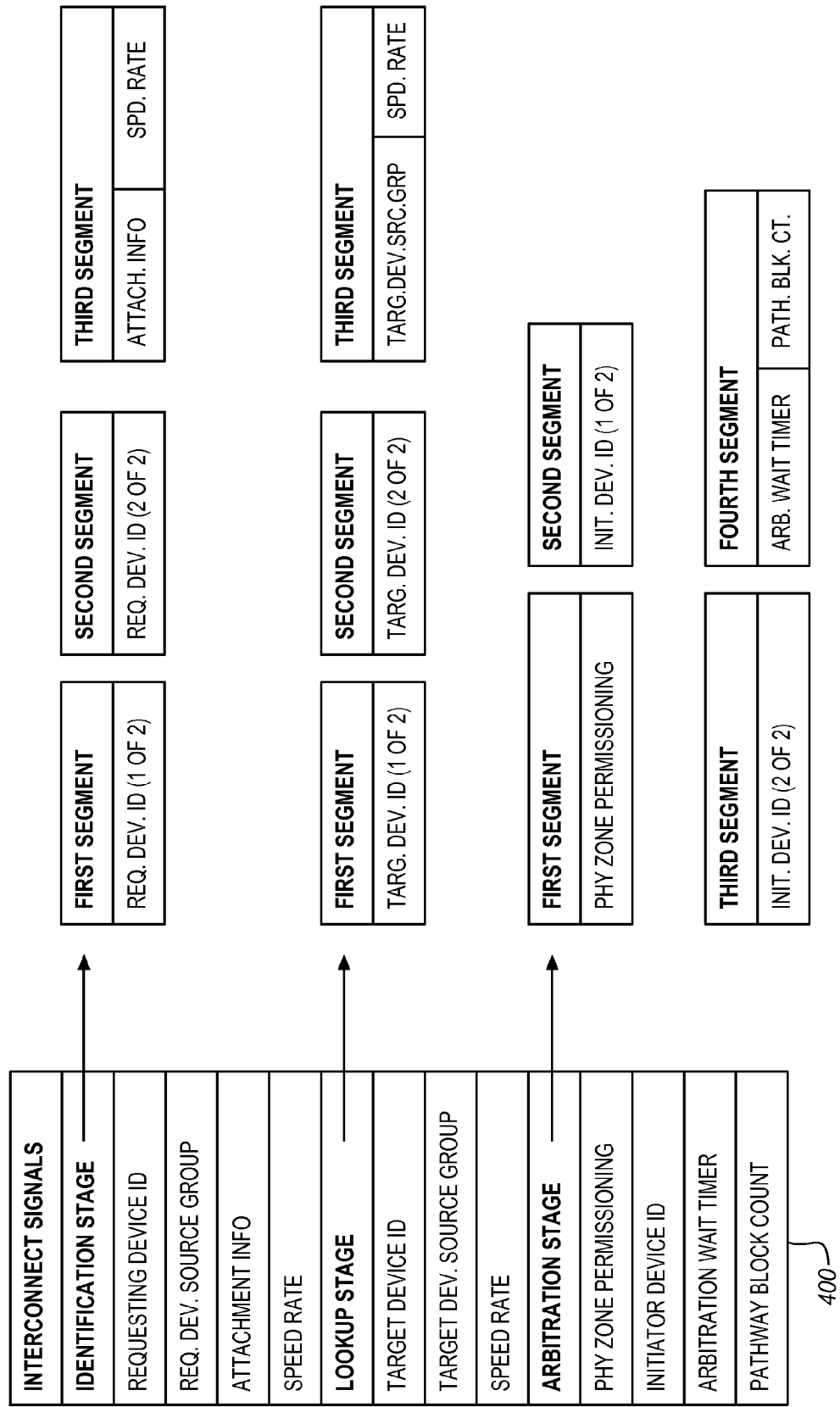
FIG. 4 is a diagram illustrating an exemplary segmenting of interconnect signals into data segments in accordance with features and aspects hereof.

FIG. 4 is a diagram illustrating an exemplary segmenting of interconnect signals 400 into data segments in accordance with features and aspects hereof. According to FIG. 4, the SAS interconnect signals are broken up into three distinct stages, and each stage includes one or more data segments of thirty two bits. The stages include an identification stage, a lookup stage, and an arbitration stage. In other embodiments, any number of different stages may be utilized, each stage including any number of data segments as a matter of design choice. Furthermore, the overall number of interconnect signals that are segmented, the number of signals included in each stage, and the size of each data segment may vary. For example, the number of data segments for each stage may be a function of the size of the bus used, and also a function of the anticipated processing time that will take place at the connection manager.

According to FIG. 4, the identification stage is broken up into three data segments. In this example, the first data segment of the identification stage includes one half of an identifier for the requesting device (e.g., a World Wide Name (WWN), an identifier derived from a WWN, etc.). The second data segment includes the second half of the identifier for the requesting device. The third data segment includes attachment information, a speed rate, and a source group for the requesting device (not shown at the data segment). The attachment information describes the type of device that is connected to the associated port of the expander. The third data segment is also used to trigger a command to the connection manager to store received device information at a list of directly attached devices. Thus, upon processing the identification stage, the connection manager may determine the identity and nature of the requesting SAS device.

The lookup stage includes interconnect signaling used to identify the target SAS device and also includes signaling for routing a SAS connection to the target SAS device. The lookup stage is broken up into three data segments. The first data segment includes one half of the identifier for the target device, and the second data segment includes the other half of the identifier for the target device. The third segment indicates a source group for the target device, and further indicates a speed rate. The source group information in SAS is used to determine permissions for accessing the target device using SAS expander zone permissioning information in accordance with the SAS standards. Thus, upon completion of the lookup stage, the connection manager may determine the identity and nature of the target SAS device as well as permissions relating to the target SAS device. Note that in this example, the lookup stage includes an inherent latency of a few clock pulses. During this latency, data for the next stage (here, the arbitration stage) can be sent.

The arbitration stage includes interconnect signaling used to determine a priority of the initiating device for using a bus of the SAS expander. This priority may be compared to other SAS devices attempting to use the same route through the expander. Access may be granted or denied by the connection manager based upon this prioritization. The arbitration stage is broken up into four data segments. The first data segment includes PHY zone permissioning data. Note that in this example, T10 PHY based zoning is implemented at the link level, and T10 group based zoning is implemented at the connection manager. Thus, receiving PHY zone permission data allows for zone checks to be performed in a single operation at the connection manager during a single stage. The second data segment includes one half of an identifier for the initiating SAS device (e.g., a SAS device that initially requested a connection with the target device), and the third data segment includes the other half of the identifier. The initiating device may occasionally be directly coupled with the SAS expander. In this case, the initiating device and the requesting device are one and the same. However, in many cases, the initiating device is not directly coupled with the SAS expander, so it sends a request to a requesting device, which itself is directly coupled with the SAS expander. In this example, the fourth and final data segment includes an Arbitration Wait Timer (AWT) and a Pathway Block Count (PBC). These two values are used to determine the priority of an incoming request. For example, if two links request the same destination PHY, the values for AWT and PBC can be used to determine priority. If a link is waiting for a higher-priority request to complete, the AWT is incremented over time, thereby increasing the priority of the link that is waiting. This information may be used to determine the present availability of the SAS connection to the initiating device. Therefore, using these data segments, the connection manager may prioritize the bus and provide it to the appropriate requesting SAS device.

Figure 5:
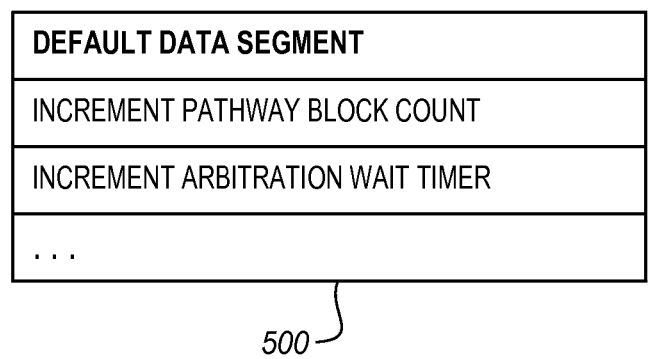
FIG. 5 is a diagram illustrating an exemplary default signals in accordance with features and aspects hereof.

FIG. 5 is a diagram illustrating exemplary default signals in accordance with features and aspects hereof. According to FIG. 5, the default signals are implemented at a data segment 500 and include a variety of signaling information which is used during the arbitration stage, but ignored during other stages. The default signals include an instruction to increment a PBC, an instruction to increment an AWT, and other signaling which may be used to manage the arbitration stage. For example, the signaling may request that information on a linked device be updated or altered at the connection manager, may indicate that a requesting link is in a switching state, may trigger resolution logic that clears deadlock conditions at the connection manager, or may release a connection with the connection manager. Data segment 500 may therefore provide relevant control signals for use while the connection manager processes the arbitration stage.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A Serial Attached SCSI (SAS) expander comprising:
a plurality of link layer control circuits, each link layer control circuit adapted to communicatively couple with a SAS device; and
a connection manager communicatively coupled with the link layer control circuits for routing communications between the link layer control circuits,
wherein each of the plurality of link layer control circuits is adapted to establish a SAS connection with another link layer control circuit through the connection manager by segmenting a plurality of interconnect signals into multiple data segments for sequential transmission to the connection manager,
wherein the connection manager is adapted to interpret the data segments to extract the plurality of interconnect signals to establish the SAS connection.

2. The SAS expander of claim 1, wherein:
each of the plurality of link layer control circuits is further adapted to transmit data segments in stages of multiple data segments, the segments for a stage transmitted on consecutive clock pulses of the SAS expander.

3. The SAS expander of claim 2, wherein:
each of the link layer control circuits is further adapted to transmit data segments for one of the stages during processing by the connection manager of interconnect signals for another stage.

4. The SAS expander of claim 2, wherein:
each data segment comprises thirty two bits.

5. The SAS expander of claim 2, wherein:
each data segment is accompanied by a data type indicating the stage to which the data segment belongs.

6. The SAS expander of claim 1, wherein:
each of the plurality of link layer control circuits is further adapted to segment the interconnect signals into data segments based upon a processing speed of the connection manager.

7. The SAS expander of claim 6, wherein:
each of the plurality of link layer control circuits is further adapted to segment the interconnect signals into data segments based upon a processing delay of the connection manager during a stage associated with establishing the SAS connection.

8. A method comprising:
detecting, at a first link layer control circuit of a SAS expander, a request to establish a SAS connection with a second link layer control circuit of the SAS expander through a connection manager that communicatively couples the link layer control circuits and is adapted to route communications between the link layer control circuits;

segmenting a plurality of interconnect signals at the first link layer control circuit into multiple data segments for transmission to the connection manager;

transmitting, in sequence, the multiple data segments to the connection manager; and interpreting the data segments at the connection manager to extract the plurality of interconnect signals to establish the SAS connection.

9. The method of claim 8, further comprising:

transmitting the data segments in stages of multiple data segments, the segments for a stage transmitted on consecutive clock pulses of the SAS expander.

10. The method of claim 9, wherein transmitting comprises:

transmitting data segments for one of the stages during processing by the connection manager of interconnect signals for another stage.

11. The method of claim 9, wherein:

each data segment comprises thirty two bits.

12. The method of claim 9, further comprising:

accompanying each data segment with a data type that indicates the stage to which the data segment belongs.

13. The method of claim 8, wherein segmenting the interconnect signals comprises:

segmenting the interconnect signals into data segments based upon a processing speed of the connection manager.

14. The method of claim 13, wherein segmenting the interconnect signals further comprises:

segmenting the interconnect signals into data segments based upon a processing delay of the connection manager during a stage associated with establishing the SAS connection.

15. A non-transitory computer readable medium embodying programmed instructions which, when executed by a processing element of a SAS expander, are operable for performing a method comprising:

detecting, at a first link layer control circuit of a SAS expander, a request to establish a SAS connection with a second link layer control circuit of the SAS expander through a connection manager that communicatively couples the link layer control circuits and is adapted to route communications between the link layer control circuits;

segmenting a plurality of interconnect signals at the first link layer control circuit into multiple data segments for transmission to the connection manager;

transmitting, in sequence, the multiple data segments to the connection manager; and interpreting the data segments at the connection manager to extract the plurality of interconnect signals to establish the SAS connection.

16. The medium of claim 15, the method further comprising:

transmitting the data segments in stages of multiple data segments, the segments for a stage transmitted on consecutive clock pulses of the SAS expander.

17. The medium of claim 16, wherein the transmitting comprises:

transmitting data segments for one of the stages during processing by the connection manager of interconnect signals for another stage.

18. The medium of claim 16, wherein:

each data segment comprises thirty two bits.

19. The medium of claim 16, further comprising:

accompanying each data segment with a data type that indicates the stage to which the data segment belongs.

20. The medium of claim 15, wherein segmenting the interconnect signals comprises:

segmenting the interconnect signals into data segments based upon a processing speed of the connection manager.

* * * * *